Feb. 6, 1962 R. W. SHAWFRANK 3,020,377
ARTICLE PERFORATION AND FOOD PRESERVATION
Filed April 21, 1958 3 Sheets-Sheet 1
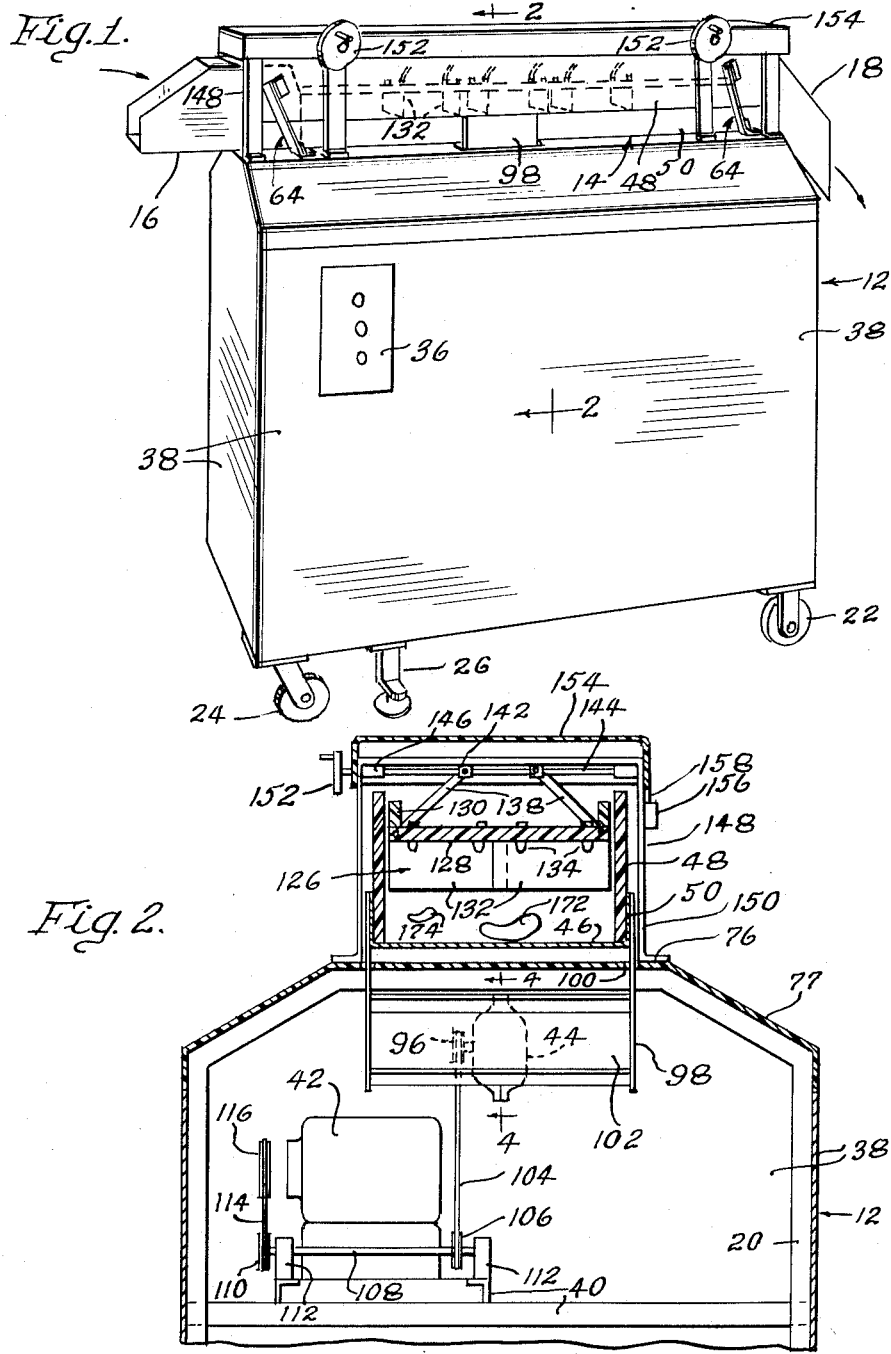
Inventor:
Robert W. Shawfrank
By Horton, Davis,
Brewer & Brugman
Attys.

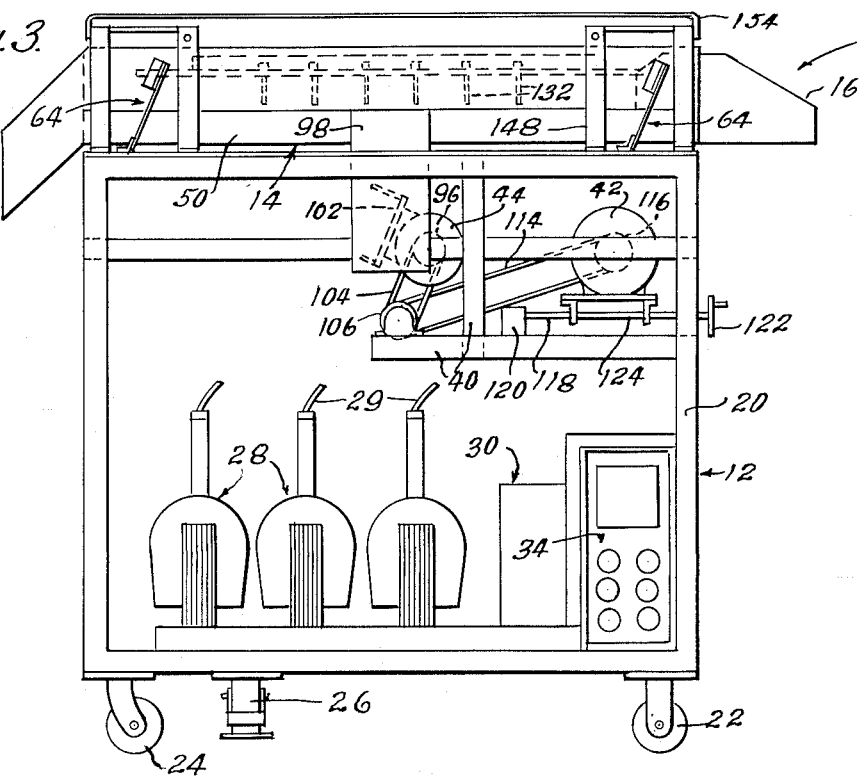
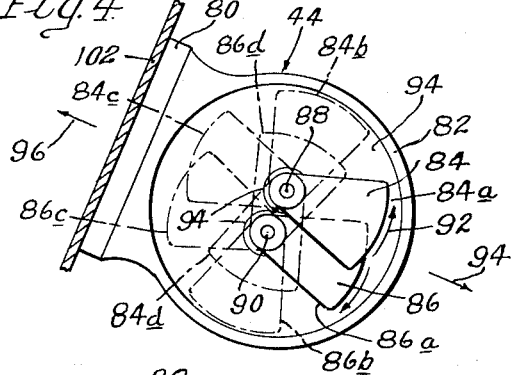
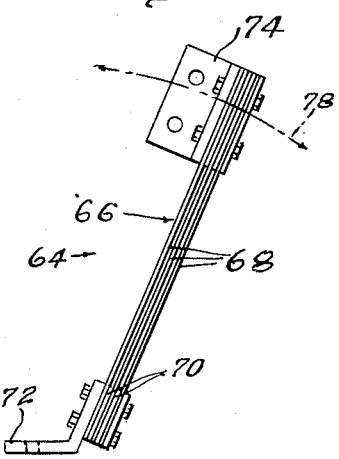
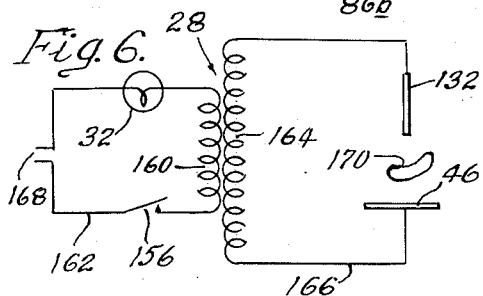

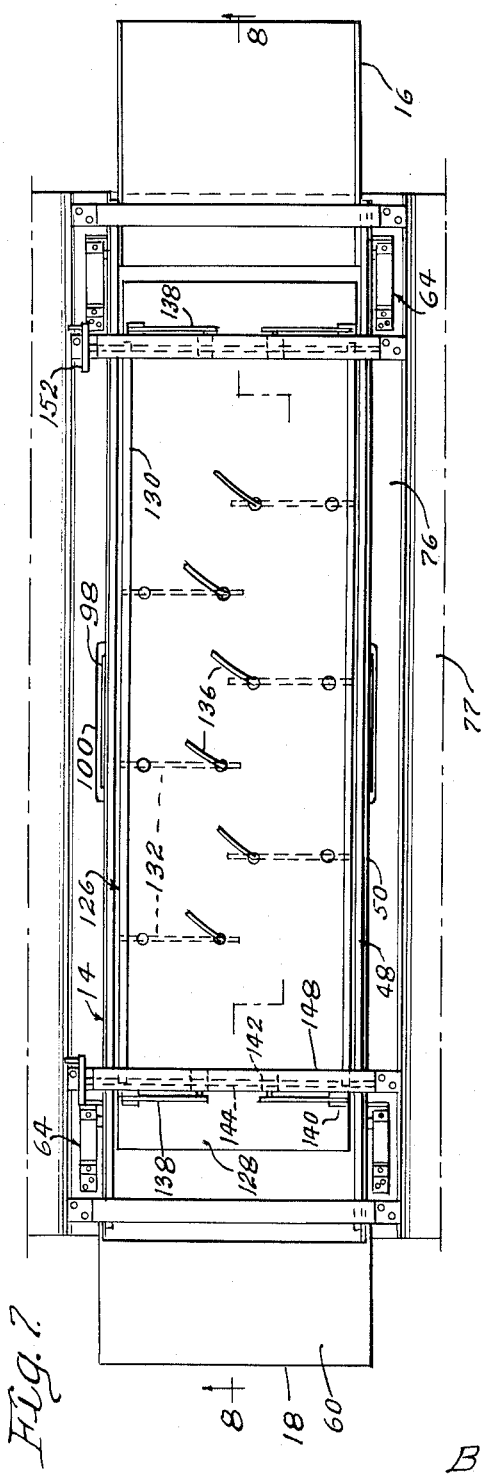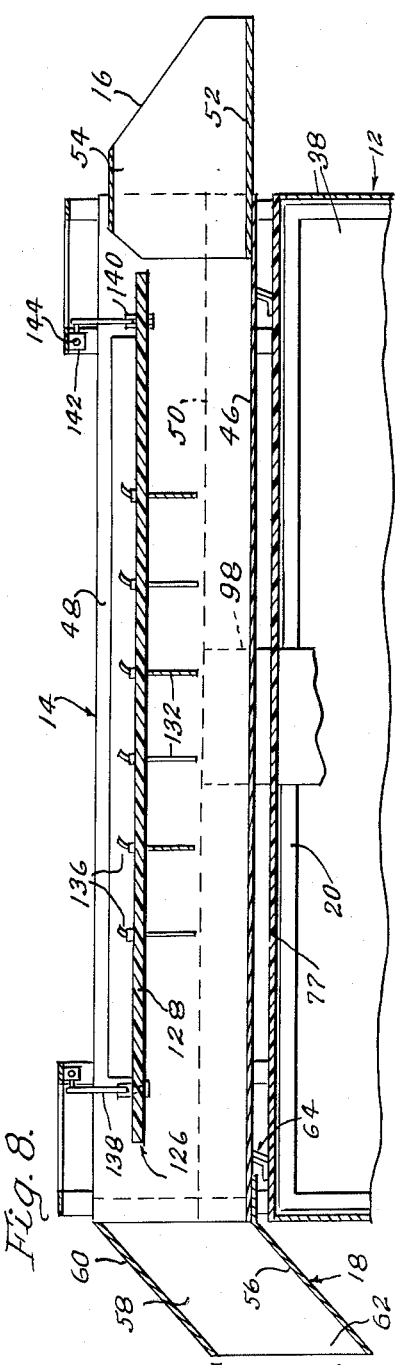

United States Patent Office 3,020,377
Patented Feb. 6, 1962

3,020,377
ARTICLE PERFORATION AND FOOD
PRESERVATION
Robert W. Shawfrank, Chicago, Ill., assignor to Hussman
Engineering Corp., a corporation of Illinois
Filed Apr. 21, 1958, Ser. No. 729,975
13 Claims. (Cl. 219—19)

The present invention relates to novel apparatus for and method of perforating articles and to a method of treating food so perforated.

In the preservation of certain articles of food, the food is subjected to immersion in various solutions. It is desired that the solution penetrate into the interior of the body of the food, and in the case of those foods that are relatively solid, the penetration requires great periods of time. An example of such food that requires a considerable time for such penetration is cucumbers, although the invention is not limited to this item. In the case of the example given, namely cucumbers, the cucumbers are soaked in a salt solution or brine in an initial portion of the preservation treatment and in a sugar solution in a later portion. Although, normally, there may not be need for speed for the salt solution to penetrate the food, usually there is in the case of the sugar solution, due to practical considerations in producing food, such, for example, as in storing, etc.

It has been found that if the food is perforated, the material for treating it, such as the sugar solution, penetrates entirely into the body of the food much more quickly. It has been attempted to so perforate the food by mechanical means, and by electric arcs, but heretofore such methods have not been entirely satisfactory.

A principal object of the invention is to provide a new method of completely perforating articles.

Another object is to provide a method of treating food made more effective because of the utilization therein of the more complete perforation thereof, of the character stated above.

Another object is to provide novel apparatus for perforating articles such as food.

A further object is to provide apparatus for perforating food utilizing a high voltage arc, wherein novel means is provided for automatically controlling such arc, and more particularly means for automatically establishing and extinguishing the arc in accordance with the passage of the articles to be perforated, through the apparatus.

Another and more specific object is to provide transformer means for producing the high voltage arc mentioned, and variable resistor means in the primary winding thereof operative for interrupting and re-establishing the circuit through the transformer and thus interrupting and re-establishing the arc through articles passing between electrodes provided in the circuit.

A further object is to provide apparatus for perforating articles by means of a high voltage arc, wherein a special arrangement of electrodes is provided for effecting complete and universally distributed perforation of the articles.

A still further object is to provide apparatus of the foregoing character, wherein the articles being perforated are impelled through the apparatus by a vibrating action whereby to maintain the articles in a constantly tossing and turning motion, and thereby to completely and effectively perforate the articles notwithstanding non-uniformity in size thereof, and notwithstanding a liquid bath in which the articles are immersed and which might otherwise cause non-uniform perforation.

Other objects and advantages of the invention will appear from the following detailed description taken in conjunction with the accompanying drawings in which:

FIG. 1 is a perspective view of a machine embodying the features of the present invention;

FIG. 2 is a vertical transverse sectional view of the machine of FIG. 1, being taken on the line 2—2 of FIG. 1;

FIG. 3 is a side elevational view taken from the side opposite that presented in FIG. 1, and with a portion of the exterior enclosing element removed;

FIG. 4 is a detail view of a vibrator used in the machine, being taken on line 4—4 of FIG. 2;

FIG. 5 is a detail view of one of the legs supporting the vibrating trough;

FIG. 6 is a diagram of the electric circuit utilized for producing the high voltage arc;

FIG. 7 is a top plan view of the central portion of the machine, with the top cover means removed; and FIG. 8 is a sectional view taken on line 8—8 of FIG. 7.

Referring now in detail to the drawings, the machine or apparatus embodying the features of the present invention is shown in its entirety in FIGS. 1 and 3. The machine includes a stand or body portion 12 having certain operating and control means enclosed therein, and described in detail hereinbelow, and a trough 14 mounted atop the body portion and arranged for receiving the articles to be perforated therein for passage of those articles through the trough and discharging them from the opposite end. The articles are inserted in the trough at a first end at which an extension 16 is provided for receiving them. At the opposite or discharge end is an extension or spout 18 through which the articles leave the trough and drop into a suitable receptacle (not shown).

The stand or body portion 12 includes a framework indicated in its entirety at 20 which may be of any desired detail structure and preferably is an assemblage of angle irons suitably welded together. The various components of the framework are located at the desired locations in accordance with usual practice in constructing such framework and for supporting the various operating and control members contained in the stand.

The stand 12 is provided with suitable wheels 22 and casters 24 for rendering the machine fully mobile. If desired, suitable jacks or stands 26 may also be provided, preferably adjacent the casters 24 for manipulation between an extended position in which they support the respective end and for maintaining the machine stationary, and a retracted or elevated position as shown in FIG. 3, elevated above the supporting surface or floor, whereby the casters 24 support the corresponding end of the machine, for providing the desired mobility to the machine.

The framework 20 is utilized for supporting a plurality of transformers 28, which in the present instance are six in number, only certain ones being exposed to view in FIG. 3, these transformers being connected through conductors 29 with respective ones of a plurality of electrodes, in the trough 14, as explained fully hereinbelow.

Enclosures 30 may also be provided for containing certain controls such as variable resistors, which in the present instance are preferably in the form of electric light bulbs 32 (FIG. 6). These resistors will be referred to hereinbelow, and as there pointed out, they are not limited to electric light blbs. Additionally, conventional control elements such as switches, etc. are provided, as indicated at 34 and 36. Preferably the framework 20 is provided with an enclosing wall element or skin 38 for enclosing all of the various members within the stand 12 and presenting a smooth and generally continuous exterior surface. One panel of the enclosing wall or skin is removed from FIG. 3 for showing the various elements and instrumentalities contained within the stand.

The framework 20 includes elements 40 for supporting an electric motor 42 utilized for driving a vibrator 44 which in turn is utilized for imparting a vibrating motion to the trough 14. The details of this vibrating action will be described in detail hereinbelow.

The trough 14 as stated above, is arranged for receiving the articles to be perforated and the transmission of those articles through the trough to the exit or discharge end. The articles are impelled through the trough by the vibrating action referred to, the trough being positioned preferably substantially horizontal. The trough is shown most clearly in FIGS. 2, 7 and 8, and includes a bottom member or floor element 46 which preferably is a metal member which is readily adaptable to fabrication, but which also is highly conductive of electricity, forming one electrode for a high voltage arc established for perforating the articles passing through the trough. The trough includes side walls 48 of insulating material. It is also preferred that the side walls 48 be transparent to provide visual observation of the articles passing through the trough. I have found that a plastic material known as "Lucite" serves well for this purpose. The bottom or floor element 46 has side flanges 50 abutting the outer surface of the side walls 48 and secured thereto by suitable means such as rivets or bolts, for forming a unitary and rigid trough. The extension 16 of the trough referred to above may conveniently be a separate piece from the trough proper and formed of sheet metal construction, having a floor element 52 engaging the bottom or floor element 46 of the trough above the latter, and side flanges 54 engaging the inner surfaces of the side walls 48, and secured thereto by suitable means such as rivets or bolts. The extension 16 as will be noted is open at the top, at least at the outer portion thereof, for receiving the articles, such as cucumbers, to be perforated. The trough extension 18 at the opposite or discharge end also preferably is of sheet metal construction and has a bottom element 56 engaging the bottom element or floor of the trough, under the latter, side walls 58 engaging the side walls 48 of the trough preferably on the outer surfaces of the latter, and secured thereto by suitable means such as rivets or bolts, and finally a top element 60. The end remote from the trough as indicated at 62 is, of course, open for enabling the articles to pass therethrough.

The means for supporting the trough 14 and enabling vibration thereof includes a plurality of legs 64 on opposite sides of the trough, and adjacent the ends thereof. One of these legs is shown in enlarged view in FIG. 5. Each leg has a main linear portion 66 made up of a plurality of elements 68, which in the present arrangement are of spring material. The elements 68 are preferably spaced apart by means of spacers 70 and the linear portion 66 is provided with a bracket 72 at the lower end and a bracket 74 at the upper end, the brackets being appropriately shaped for securement to the linear portion 66 and adjacent elements of the machine The bracket 74 is secured to the adjacent side wall 48 of the trough while the bracket 72 is secured to the framework 20 of the machine on a ledge 76 which is provided on the stand. The top of the stand is closed by a shield or cover member 77 which also is preferably of insulating material. I have found that "Lucite," indicated above, is suitable for providing the necessary insulation at this location, although it need not be transparent and preferably is not transparent. The bracket 72 engages the cover member 77, and is secured to the respective element of the framework 20 thereunder by suitable means such as bolts or rivets.

The legs 64 are arranged at an angle to the vertical for controlling the direction of vibration of the trough 14 in response to the vibrating motions imparted thereto by the vibrator 44. It has been found that maximum vibration is produced by disposing the legs at an angle of between 20° and 27° to the vertical. The trough in response to being vibrated follows a vibrating direction which closely approximates a line perpendicular to the linear portion 66, although of course, it is slightly arcuate. The elements 68 of spring material flex to accommodate the movement of the trough. The trough vibrates upward and to the left and downward and to the right, as viewed in FIGS. 3 and 5 and the articles in the trough are thrown to the left. In the movement of the trough in the opposite direction, the articles are not moved, and the net result is a constant impelling effect of the articles through the trough.

The vibration of the trough is produced by the vibrator 46, as mentioned above, and attention is directed to FIGS. 2–4 for details of the vibrator and the detail function thereof. The vibrator shown herein is of known and conventional construction and is illustrated somewhat schematically. The vibrator essentially includes oppositely acting weights which are rotated in opposite directions and alternately assume positions of relative balance and imbalance.

The vibrator 44 includes a base 80 and a housing 82. A pair of weights 84 and 86 are mounted on respective shafts 88 and 90 in the housing 82, these shafts being journalled in opposite end walls of the housing, one of which is shown at 94. It will be understood that the weights 84 and 86 are relatively displaced in direction axially of the shafts. The shafts and weights are arranged for rotation in opposite directions as indicated by the arrows 92, having intermeshed pinions 94 on the shafts. One of the shafts is provided with a pulley 96 (FIGS. 2 and 3).

The weights 84 and 86 are shown in full lines in FIG. 4 in one position of imbalance. This position is shown by the subscript $a$. Upon rotation of the weights 90° they assume position $b$; upon further rotation 90° they assume position $c$; and finally upon further rotation of another 90° they assume position $d$. In the first position, or position $a$, the weights are both on the same side of the plane containing the axes of the shafts 88 and 90 and hence throw the vibrator in a first direction, indicated by the arrow 94. At position $b$ the weights are substantially coincident with such plane and counterbalance each other. In position $c$ the weights are again both on the same side of the plane mentioned, but the opposite side, and throw the vibrator in the opposite direction, as indicated by the arrow 96. Finally, at the fourth position, $d$, the weights are again in coincidence with the plane mentioned and are counterbalanced. Hence, at positions $a$ and $c$, the vibrator is thrown in opposite directions, while in the alternate and opposite positions $b$ and $d$, respectively, there is no tendency to throw the vibrator.

The vibrator 44 is mounted on and supported by the trough 14 through the medium of a pair of lugs 98 which are secured to the flanges 50 on the trough and extend down through holes 100 in the cover member 77 into the interior of the stand 12. Interconnected between lower ends of these lugs is a mounting plate 102 secured to the lugs in a suitable manner such as by welding. The vibrator is mounted on this plate 102. The weights 84 and 86 are arranged so as to assume their positions of imbalance indicated at $a$ and $c$ (FIGS. 3 and 4) preferably at opposite ends of a line extending generally in the same direction as the line or arc 78 in FIG. 5. In other words the throw of the vibrator is in directions in which the trough is intended to be vibrated according to the accommodations provided by the legs 64.

The drive between the motor 42 and the vibrator 44 may be of any suitable kind and preferably includes a belt 104 trained on the pulley 96 on the vibrator, and another pulley 106 mounted on a shaft 108 and having a pulley 110 on its opposite end. The shaft 108 is supported in bearings 112 mounted on the frame elements 40. Another belt 114 drivingly interconnects the pulley 110 and another pulley 116 on the drive shaft of the motor 42.

The various members and components of the vibrator 44 and the bearing support and drive thereof, are preferably arranged so that the belt 104 is disposed at the same angle as the legs 64, or in the present instance, an angle of between 20° and 27° to the vertical. The movement of the vibrator 44, following similar movements of the trough thus follows closely an arcuate line concentric with the axis of the pulley 106 and the belt 104 therefore is not subjected to material stretching action due to the vibrating motions.

The vibrator 44 possesses a certain natural frequency for greatest vibrating effect and in order to facilitate attainment of such frequency, adjustment means is provided for easily effecting the critical speed of rotation thereof. To accomplish this end, any of a number of different means may be utilized but preferably it assumes a known arrangement including a variable speed driving connection between the motor and the belt 114. This may be accomplished by providing a V-belt and providing a pulley 116 of the kind having parts relatively movable along the axis thereof, spring-biased together but capable of being moved apart by the belt 114 in response to increase in tension thereof. To accomplish such adjustment, the motor 42 is mounted on the frame elements 40 for movement toward and from the pulley 106 by means of a screw threaded shaft 118. One end of the shaft 118 is journalled in a bearing means 120 mounted on the frame elements 40 and at the other end in the framework and exposed to the exterior where a hand wheel 122 is provided for manually rotating the shaft. The screw threaded shaft 118 is threadedly engaged in elements 124 on the motor and in response to rotation of the shaft the motor is adjusted in either of opposite directions toward or from the pulley 106 to effect the said adjustment in speed of rotation of the vibrator.

Supported in the trough 14 and cooperating with the bottom element or electrode 46 thereof for producing the intended high voltage arc, in an electrode carrier indicated in its entirety at 126. This electrode carrier includes a horizontal plate 128 of insulating material, and preferably a transparent material which suitably may be of the same material forming the side walls 48. Extending upwardly from each edge is a wall element 130 also preferably of the same material as the plate 128. Supported on and depending from the plate 128 is a plurality of electrodes 132 which in the present instance are six in number and are staggered relative to one another in direction longitudinally through the trough. FIG. 7 shows the staggered relation to best effect, there being in the preferred arrangement three electrodes on each half or lateral side of the plate 128. These electrodes extend transversely of the trough and are spaced apart longitudinally of the trough preferably in uniform intervals, and overlap the center portion, in projected view, a slight amount as shown clearly in FIGS. 2 and 7 so as to eliminate the possibility of a gap between the laterally disposed electrodes, considering the passage longitudinally through the trough. These electrodes cooperate with the bottom element or electrode 46, for providing the high voltage arc for the perforating operation, described in detail hereinbelow. The electrodes 132 are secured to the plate 128 by any suitable means such as by bolts or studs 134 which may be welded to the electrodes and extend through apertures in the plate 128. Conductors 136 are provided for connecting the respective electrodes in circuit. The electrodes, considered together, span effectively the full width of the trough, there being only a small space between the electrodes and side walls (FIG. 2) in accordance with acceptable tolerances.

The electrode carrier 126 is mounted in the trough for vertical adjustment for adjusting the gap between the electrodes 132 and the bottom electrode 46. This adjusting means preferably takes the form of a pair of links 138 at each end of the plate 128 and pivotally secured thereto at their lower ends by means of suitable adapters 140. The upper ends of the links are connected to followers 142 for pivoting movement relative thereto, the followers being threaded on a respective screw threaded shaft 144. One such shaft is provided adjacent each end of the electrode carrier for operating the respective pair of links 138. The shafts 144 are journalled in suitable bearing members 146 (FIG. 2) supported by frame elements 148. The frame elements 148 may be angle irons or straps and each is generally inverted U-shape with the lower ends of the legs 150 thereof secured to the ledges 76 by suitable means such as rivets or bolts. These frame elements 148 extend over the top of the trough 14 and provide a suitable upper frame or super structure. The screw threaded shafts 144 are provided with hand wheels 152 exposed to the exterior for hand manipulation. Upon rotation of the shaft 144 in response to the manipulation to the hand wheels 152 the followers 142 are threaded in appropriate direction toward or from each other along the shaft, the threads on opposite halves of the shafts being respectively right and left hand threads, and the electrode carrier 126 is accordingly raised or lowered.

Preferably the trough 14, and particularly the electrode carrier 126, is covered or enclosed by means of a cover or lid 154 which may be a simple, inverted pan-like cover fitted over the top of the frame members 148. Preferably this cover member 154 is of insulation material and it may be of the same plastic material as the side walls 48. If desired, a control switch 156 in the form of a micro switch may be mounted on one of the frame members 148 with an actuating pin 158 engaged by the cover 154. The switch 156 is closed by the cover member 154, being otherwise open, to provide a safety means whereby the electric circuit is closed only when the cover member 154 is in place.

Attention is next directed to FIG. 6 showing the circuit utilized for providing high voltage arc for perforating the articles. This circuit includes a transformer 28 and resistor 32 referred to above. The primary winding 160 is included in a primary circuit 162 which also includes the resistor or electric light bulb 32. The secondary winding 164 is included in a secondary circuit 166 which includes one of the electrodes 132 and the bottom electrode 26 of the trough 14. The primary circuit 162 is connected with a suitable source of alternating current at 168. Thus there is a transformer in circuit with each of the electrodes 132.

In the use of the apparatus the articles to be perforated are deposited in the trough extension 16, the articles in the example referred to above being cucumbers. Due to the vibration of the trough, the articles are impelled along the trough to the discharge end and in so passing through the trough, they pass between the electrodes 136 on the electrode carrier and the bottom electrode 46. Each transformer 28 is of such character as to produce high voltage in the secondary circuit in response to normal line voltage in the primary circuit. For example, 110 volts imposed on the primary circuit produces in the neighborhood of 15,000 volts in the secondary circuit, at the electrodes 132 and 46. The spacing between the opposed-pole electrodes 132 and 46 is so selected that in the absence of any article passing therebetween, no arcing occurs, but in response to an article being introduced between the electrodes, the effective distance between the electrodes is reduced to such an extent that an arc is established between the electrodes and through the cucumbers. Such a cucumber is shown at 170 in FIG. 6; in FIG. 2 there are shown cucumbers 172 and 174 of different sizes.

The establishment and extinction of the high voltage arc is controlled by the variable resistor 32. As indicated above, this variable resistor conveniently is in the form of an electric light bulb although it will be understood that other kinds of resistors having a positive temperature coefficient of resistance may be utilized. In the case of such kind of resistance, and an electric light bulb, the resistance to flow of electricity therethrough when the bulb is extinguished and cooled is, from a practical standpoint, zero. Upon the arc being established between the electrodes 132 and 46, current flows and the light bulb is heated to incandescence and its resistance reaches maximum value. The flow of current accordingly is greatly reduced, and the current induced in the secondary circuit is reduced proportionately a much greater amount from the value necessary for maintaining the arc between the electrodes, and the arc is extinguished. Thereupon, the light bulb 32 also extinguished and cools and again allows the flow of current therethrough. As a result, the high voltage arc between the electrodes is established and extinguished repeatedly and rapidly. For example, while a single cucumber passes through the gap between the electrodes (i.e., any one of the electrodes 132 and the electrode 46) the arc may be established and extinguished many thousands of times. As a result, the cucumber is perforated completely and uniformly throughout the body thereof. The detailed manner in which the high voltage arc actually effects the perforation is not fully understood but it is believed that each time an arc is established it is in the form of a pencil or line which penetrates through the cucumber. In view of the large number of times that the arc is established, relative to the rate of passage of the cucumber between the electrodes, the body of the cucumber is completely perforated throughout, notwithstanding the pencil or line form of the arc.

The disposition of the control electric light bulb 32 in the primary circuit constitutes a novel means for establishing and extinguishing a high voltage arc which in turn is controlled or set up by the mere passage of the articles to be perforated between the electrodes. In other words, so long as there is no article between the electrodes, there will be no arc established, but immediately in response to the presence of a cucumber between the electrodes, an arc is established and repeatedly extinguished and re-established so long as the cucumber remains between the electrodes. The arc is at full value each time it is established, and there is no intermediate condition in which an arc of lesser value than the intended full value is established such for example, as may occur when a control element is interposed in the secondary circuit. The relatively small variation in the current in the primary circuit produces a greatly magnified variation in the current in the secondary circuit, such as to produce the intended high voltage arc and alternate complete extinguishment.

Articles such as cucumbers, as well as many other articles, are relatively non-porous, whereby a solution penetrates through them very slowly. The perforation produced by the high voltage arc in the practice of the present invention enables such penetration in a very much shorter time. For example, the time required for sugar solution to fully penetrate and saturate cucumbers is on the order of one-seventh the time previously required. The complete perforation that is produced additionally effects much more thorough penetration and saturation, and results in a more effective method of treating food.

The vibrating motion imparted to the trough causes the cucumbers to bounce and be lifted from the floor 46 of the trough. Such condition is indicated in FIG. 6 where the cucumber 170 is disposed about midway between the electrodes. Also in FIG. 2 there is shown a large cucumber 172 lying on the floor of the trough and a small cucumber 174 suspended in mid-air. The vibrating action produces complete and uniform perforation of the articles by reason of several different phenomena. For example, if relatively large and small cucumbers should be lying side by side in a smooth passage through the trough, the relatively large cucumber would attract a greater proportion of the arc than the small cucumber and hence, possibly prevent the small cucumber from being fully perforated. Due to the fact that the cucumbers bounce, the small ones will at times be disposed for attracting the arc in preference to the large cucumbers. For example, a small cucumber while suspended midway between the electrodes may well attract the arc in preference to a large cucumber lying on the floor of the trough due to the fact that the gap on either side of the small cucumber is less than the single large gap between the large cucumber and the upper electrode.

Another advantage in the bouncing and vibrating action is that the cucumbers tumble and turn to expose all portions of their surface to the arc, producing more uniform and complete perforation. This enhances the action of a solution penetrating and saturating the cucumbers.

Another advantage of the bouncing and vibrating action of the cucumbers is the reduction of the tendency of the arc to bypass, at least partially, the body of the cucumber. For example, if a cucumber is lying on the floor of the trough, it is of such size as to induce or establish the arc by reducing the effective gap between the electrodes and although the arc would penetrate the cucumber, the arc may be deflected toward one side of the cucumber where its thickness is less and continue to the bottom electrode 46. The center or core of the cucumber in such case, may not be completely perforated. In the case of the cucumber bouncing, the tendency for the arc to bypass around the center of the cucumber is reduced and it more effectively passes entirely and directly through the cucumber and produces a more uniform and universal perforating effect. Moreover, the bouncing effect of the cucumbers is more positive in triggering or establishing the arc due to the erratic movement than would be the case if the cucumbers should slide smoothly through the trough.

An additional advantage has to do with the liquid usually associated with the cucumbers in the perforating operation. As noted above, the cucumbers in the treatment thereof are immersed in a brine, in a certain step of the treating operation. Often the cucumbers and brine together are introduced into the perforating machine and the liquid or brine forms a film on the floor of the trough. This liquid has the effect of reducing the gap between the electrodes and often causes establishment of the arc when not intended and when the arc is so established, the liquid attracts the arc from the cucumber. However, the bouncing effect of the cucumber counteracts this possible disadvantage in that the cucumber while being suspended in mid-air attracts the arc in preference to the liquid brine such as would form a film on the floor of the trough in a smooth, flowing or sliding action, as mentioned.

A further advantage of the bouncing effect is that while the cucumbers are in mid-air, they seldom touch each other and hence, the arc when established by reason of a particular cucumber, passes through that same cucumber and not some other cucumber that is touching it. In other words, an arc, when established, passes through each cucumber individually.

The apparatus and method of perforating are adapted to many articles, and may be utilized in connection with any articles subject to perforation by an electric arc.

The staggered arrangement of the electrodes is such that an arc may be established at a number of locations transversely of the trough in the different electrodes so as to prevent cucumbers at one side of the trough from attracting the arc from cucumbers at the opposite side. The electrodes 132 are adjusted up or down according to the overall size or average size of the batch of cucumbers (or other articles) being perforated.

It is thought that the invention and many of its attendant advantages will be understood from the foregoing description and ti will be apparent that various changes may be made in the form, construction, and arrangement of the parts without departing from the spirit and scope of the

I claim:

1. Means for perforating articles, of the character disclosed, comprising a transformer including a primary winding and a secondary winding, a secondary circuit including said secondary winding, opposed electrodes in said secondary circuit adapted in response to passage of an article to be perforated therebetween to have an arc established therebetween, a primary circuit including said primary winding, means in said primary circuit for automatically extinguishing an arc established between said electrodes at a predetermined interval after establishment thereof, and means for passing articles to be perforated generally along a path between and transverse to a line extending between the electrodes and simultaneously imparting a vibratory action to the articles in directions generally along a line extending between the electrodes.

2. Apparatus of the character disclosed comprising a frame, a trough mounted on the frame, the floor of said trough constituting an electrical electrode, a second electrode mounted in the trough above and in spaced relation to the first mentioned electrode, said trough being adapted for the passage of articles to be perforated therethrough and between the electrodes, electrical arcing and control means comprising a transformer having a primary winding and a secondary winding, a secondary circuit including said secondary winding and electrodes in serial relation, a primary circuit including said primary winding, and a resistor in said primary winding having a positive temperature resistance coefficient.

3. Apparatus of the character disclosed comprising a frame, a trough mounted on the frame, the floor of said trough constituting an electrical electrode, a plurality of plates mounted in the trough transversely of the trough and in spaced relation above the first mentioned electrode and constituting electrodes opposed thereto, said trough being adapted for the passage of articles to be perforated therethrough and between the electrodes, electrical arcing and control means comprising a transformer having a primary winding and a secondary winding, a secondary circuit including said secondary winding and electrodes in serial relation, a primary circuit including said primary winding, and a resistor in said primary winding having a positive temperature resistance coefficient.

4. Apparatus of the character disclosed comprising a frame, a trough mounted on the frame, the floor of said trough constituting an electrical electrode, a plurality of plates mounted in the trough and disposed transversely thereof and each being less in length than the width of the trough, the plates together being staggered transversely in progression longitudinally along the trough, said plates constituting second electrodes opposed and spaced above the first mentioned electrode, said trough being adapted for the passage of articles to be perforated therethrough and between the electrodes, electrical arcing and control means comprising a transformer having a primary winding and a secondary winding, a secondary circuit including said secondary winding and electrodes in serial relation, a primary circuit including said primary winding, and a resistor in said primary winding having a positive temperature resistance coefficient.

5. Apparatus of the character disclosed comprising a frame, a trough mounted on the frame, the floor of said trough constituting an electrical electrode, a plurality of plates mounted in the trough and disposed transversely thereof and each being less in length than the width of the trough, the plates together being staggered transversely in progression longitudinally along the trough, said plates constituting second electrodes opposed and spaced above the first mentioned electrode.

6. Apparatus of the character disclosed comprising a frame, a trough mounted on the frame for passage of articles to be perforated therethrough, the floor of said trough constituting a first electrode, the trough having transparent side walls of electrical insulation, a supporting plate in the trough generally parallel to the floor of the trough, a plurality of second electrodes mounted on said supporting plate, longitudinally spaced transversely extending screw shafts mounted in the trough, hand cranks on the shafts exposed to the exterior of the trough, links having threaded connection at one end with said shafts and connection at the other with said supporting plate at fixed location for adjustment of the plate and thus the second electrodes toward and from the first electrode in response to rotation of the shafts, and means for establishing and completely extinguishing an arc between the respective electrodes rapidly and repeatedly in response to passage of articles to be perforated through the trough and between the electrodes.

7. Apparatus of the character disclosed comprising a frame, a generally horizontal trough on the frame, means for vibrating the trough in direction for impelling articles placed therein at a first end through the trough to the opposite end, vertically spaced opposed electrodes in the trough on opposite sides of articles passing through the trough, and means for establishing and completely extinguishing an arc between the respective electrodes rapidly and repeatedly in response to passage of articles to be perforated through the trough and between the electrodes.

8. Apparatus of the character disclosed comprising a frame, a generally horizontal trough on the frame, a plurality of parallel links inclined at an acute angle to the vertical in planes parallel with the longitudinal direction of the trough having respectively one end fixedly mounted on the frame and the other end supporting the trough and adapted for limited swinging movement in said planes, means for vibrating the trough, and said links due to their disposition being operative for confining the vibratory movements of the trough in such direction as to impel articles placed therein at one end through the trough to the opposite end, vertically spaced opposed electrodes in the trough and means for establishing and completely extinguishing an arc between the respective electrodes rapidly and repeatedly in response to passage of articles to be perforated through the trough and between the electrodes.

9. A method of perforating articles by the use of spaced electrodes for establishing an arc therebetween, comprising, passing a mass of such articles between the electrodes, forming a high voltage arc between the electrodes and extinguishing it, repeatedly, passing the arc progressively throughout the body of each of the articles due to the passage of the articles between the electrodes, and indiscriminately moving the articles rapidly and repeatedly in directions generally between the electrodes whereby all of the articles individually assume different positions of proximity to the electrodes and minimize attraction of the arc by large articles to the exclusion of small articles when articles of indiscriminate and nonuniform sizes are passed between the electrodes.

10. A method of perforating an article by the use of spaced electrodes for establishing a high voltage arc therebetween, comprising, maintaining the voltage across the electrodes and the spacing thereof such that normally and in the absence of an article between the electrodes no arc is established thereacross but when an article is positioned therebetween such an arc is established thereby, passing the article between the electrodes and thereby establishing such an arc, and automatically extinguishing the arc, repeatedly, the cycles of establishing and extinguishing the arc being short and infinitely numerous relative to the rate of passage of the article between the electrodes whereby the arc progressively perforates the article throughout the body thereof.

11. A method of perforating articles by means of a transformer having a high voltage secondary winding, and a primary winding of substantially lesser voltage, and spaced electrodes in series with the secondary winding, comprising repeatedly passing the articles between the electrodes and thereby reducing the effective distance therebetween for forming an arc, and interrupting the arc by establishing a resistance in the primary winding and breaking the circuit therethrough.

12. Means for perforating articles, of the character disclosed, comprising a transformer including a primary winding and a secondary winding producing substantially increased voltage relative to the primary winding, a secondary circuit including said secondary winding, opposed electrodes in said secondary circuit spaced apart a distance for maintaining a non-arcing condition therebetween at a predetermined voltage imposed thereon, and being adapted in response to passage of an article to be perforated therebetween to have an arc established therebetween, a primary circuit including said primary winding, and a resistance having a positive temperature resistance coefficient interposed serially with said primary winding in said primary circuit.

13. Means for perforating articles, of the character disclosed, comprising a transformer including a primary winding and a secondary winding producing substantially increased voltage relative to the primary winding, a secondary circuit including said secondary winding, opposed electrodes in said secondary circuit spaced apart a distance for maintaining a non-arcing condition therebetween at a predetermined voltage imposed thereon, and being adapted in response to passage of an article to be perforated therebetween to have an arc established therebetween, a primary circuit including said primary winding, and means interposed serially with said primary winding in said primary circuit operative for breaking that circuit at a predetermined intervals of time after establishment thereof.

References Cited in the file of this patent

UNITED STATES PATENTS

| | | |
|---|---|---|
| 1,250,140 | Chapman | Dec. 18, 1917 |
| 1,425,079 | Cone | Aug. 8, 1922 |
| 1,704,367 | Moore | Mar. 5, 1929 |
| 1,845,748 | Hey | Feb. 16, 1932 |
| 2,123,063 | Peters | July 5, 1938 |
| 2,427,588 | Burnett | Sept. 16, 1947 |
| 2,436,251 | Dobie et al. | Feb. 17, 1948 |